(12) United States Patent
Ashikaga et al.

(10) Patent No.: US 8,097,338 B2
(45) Date of Patent: Jan. 17, 2012

(54) IN-MOLD LABEL, AND LABELED RESIN-LABELED ARTICLE

(75) Inventors: Mitsuhiro Ashikaga, Ibaraki (JP); Naohide Ando, Ibaraki (JP); Yasuo Iwasa, Ibaraki (JP)

(73) Assignee: Yupo Corporation, Tokyo (JP)

( * ) Notice: Subject to any disclaimer, the term of this patent is extended or adjusted under 35 U.S.C. 154(b) by 873 days.

(21) Appl. No.: 11/597,285

(22) PCT Filed: May 20, 2005

(86) PCT No.: PCT/JP2005/009699
§ 371 (c)(1),
(2), (4) Date: Mar. 4, 2008

(87) PCT Pub. No.: WO2005/114620
PCT Pub. Date: Dec. 1, 2005

(65) Prior Publication Data
US 2008/0254275 A1   Oct. 16, 2008

(30) Foreign Application Priority Data
May 21, 2004   (JP) ................................ 2004-151318

(51) Int. Cl.
*B32B 7/12*   (2006.01)
*B32B 15/04*   (2006.01)

(52) U.S. Cl. ..... 428/347; 428/35.7; 428/34.3; 428/35.9; 428/41.3; 428/42.3; 428/36.5; 428/312.2; 428/304.4; 428/337; 428/340; 428/500; 428/523; 428/349; 428/352; 428/354; 428/355 EN

(58) Field of Classification Search ............... 428/34.1, 428/35.7, 34.3, 35.9, 41.3, 42.3, 36.5, 312.2, 428/36.92, 304.4, 337, 340, 500, 523, 347, 428/349, 352, 354, 355 EN
See application file for complete search history.

(56) References Cited

U.S. PATENT DOCUMENTS

| 5,188,395 A | 2/1993 | Kawahara et al. |
| 5,233,924 A | 8/1993 | Ohba et al. |
| 5,891,552 A | 4/1999 | Lu et al. |
| 6,551,671 B1 | 4/2003 | Nishizawa et al. |
| 2001/0003626 A1 | 6/2001 | Syoda et al. |
| 2001/0028952 A1 | 10/2001 | Nishizawa et al. |
| 2004/0161599 A1 | 8/2004 | Nishizawa et al. |

FOREIGN PATENT DOCUMENTS

| EP | 0 102 209 | 3/1984 |
| EP | 0 374 930 A2 | 6/1990 |

(Continued)

OTHER PUBLICATIONS

Official Action dated Nov. 24, 2010 issued in the corresponding Japanese Patent Application.

(Continued)

*Primary Examiner* — Michael C Miggins
(74) *Attorney, Agent, or Firm* — Browdy and Neimark, PLLC

(57) ABSTRACT

An in-mold label comprising an olefinic resin substrate layer (A) having a wetting index ($\alpha$) of from 34 to 74 mN/m and a heat-sealable resin layer (B) with an antistatic layer having a wetting index ($\beta$) of from 30 to 54 mN/m, wherein the absolute value of the initial frictional charge voltage of the substrate layer (A) relative to a sheet offset printing blanket is from 0 kV to 15 kV. This label has good workability in printing, cutting and blanking even in a low-humidity environment.

17 Claims, 2 Drawing Sheets

FOREIGN PATENT DOCUMENTS

| | | |
|---|---|---|
| EP | 0 949 599 A2 | 10/1999 |
| EP | 1 231 054 A2 | 8/2002 |
| EP | 2005743657 | 3/2007 |
| EP | 1 122 704 A1 | 8/2011 |
| JP | 58-69015 | 4/1983 |
| JP | 2-7814 | 2/1990 |
| JP | 2-843319 | 3/1990 |
| JP | H05-76766 U | 10/1993 |
| JP | H6-182941 A | 7/1994 |
| JP | 7-2414 B2 | 1/1995 |
| JP | H10-315410 | 12/1998 |
| JP | 11-352888 | 12/1999 |
| JP | 2000-25067 A | 1/2000 |
| JP | 2001-171052 A | 6/2001 |
| JP | 2002-234069 | 8/2002 |
| JP | 2002-328607 | 11/2002 |
| JP | 2003-108010 A | 4/2003 |
| JP | 2003-139904 A | 5/2003 |
| JP | 2003-295767 | 10/2003 |
| JP | 2003-336155 A | 11/2003 |
| JP | 2004-264825 A | 9/2004 |
| JP | 2005-189628 | 7/2005 |
| WO | WO 00/22601 | 4/2000 |
| WO | 2004/049284 | 6/2004 |

OTHER PUBLICATIONS

Supplementary European search report issued in corresponding Application EP 05743657.8, Sep. 13, 2010.
International Report on Patentability issued in PCT/JP2005/009699, Nov. 21, 2006.
Written Opinion issued in PCT/JP2005/009699, Nov. 21, 2006.
Database WPI Week 200444 Thomson Scientific, London, GB; AN 2004-468390 XP002598777 & WO 2004/049284 A1 (OJI Yuka Goseishi KK) Jun. 10, 2004.
Communication pursuant to Article 94(3) EPC issued May 27, 2011, by the European Patent Office in corresponding Application EP 05 743 657.8 (5 pages).
Notification of Reasons for Rejection dated Aug. 23, 2011, issued issued in copending Japanese Patent Application No. JP 2005-147940 (two pages).
English-language translation of Notification of Reasons for Rejection dated Aug. 23, 2011, issued in copending Japanese Patent Application No. JP 2005-147940 (three pages).

IN-MOLD LABEL, AND LABELED RESIN-LABELED ARTICLE

TECHNICAL FIELD

The present invention relates to in-mold production of labeled, resin-molded articles in a mode of differential pressure molding, blow molding, injection molding, vacuum molding or air-pressure molding, and concretely relates to an in-mold label and a labeled, resin-molded article.

BACKGROUND ART

For integral in-mold production of labeled, resin-molded containers, heretofore employed is a process of previously inserting a blank or a label into a mold, and then molding a container in the mold in a mode of injection molding, blow molding, differential pressure molding or foam molding to thereby label the container (e.g., JP-A-58-69015). As such in-mold labels, known are gravure-printed resin film, offset multicolor-printed synthetic paper (e.g., JP-B-2-7814, JP-A-2-84319), or aluminium label produced by lining aluminium foil with polyethylene or ethylene-vinyl acetate copolymer on its back and then gravure-printing the foil on its surface.

In-mold labels are printed with product name, manufacturer name, dealer name, character, bar code, instructions for use, etc., and then used for in-mold production. For printing them, employable are various printing methods of sheet offset printing, rotary offset printing, gravure printing, flexographic printing, letterpress printing, screen printing; but from the sharpness of the printed matters and the production costs, sheet offset printing is much used.

However, in a method for producing label-modified, resin-molded articles according to an in-mold production process of using the above in-mold label, when the antistatic performance of the label is insufficient, then the method is defective in that it causes an electrostatic trouble in label production in a low-humidity environment in winter. In a label-printing process where in-mold labels are printed in a mode of sheet offset printing, the sheets being processed into in-mold labels may have a printing trouble owing to the generation of static charges.

A sheet offset printing system is composed of three parts of a paper feeding part, a printing part and a paper delivery part. In the paper feeding part, the sheets to be printed are fed to the printing part one by one, in which each sheet is printed with ink, and then the printed sheets are conveyed to the paper delivery part, and are thereafter stacked up. In the printing part, a predetermined amount of ink is metered and fed from an ink supply to each sheet in accordance with a pattern, then applied to the printing area of a printing plate with a pattern, and transferred onto a rubber printing blanket for sheet offset printing. FIG. 1 shows a mechanism of ink transferring onto a sheet, in which a sheet (1) is sandwiched between a rubber blanket (2) for sheet offset printing and a metal impression drum (3) that synchronizes with it, and ink is thus transferred onto the surface of the substrate layer of the sheet (1). When the sheet (1) is peeled from the blanket (2) for sheet offset printing, the surface of the sheet may have static charges generated therearound. As a result, when the antistatic capability of the sheets for in-mold labels is poorer, then the sheets could not be stacked up regularly owing to the electrostatic repulsion thereof. When static charges are accumulated in the paper delivery part, it may take a lot of time to stack up them owing to their repulsion and, as a result, the printing speed could not be increased and the process is therefore inefficient.

When labels are fed into a mold with an automatic label feeder, then the static charges between the stacked labels could not be removed, therefore causing some problem in that two or more labels may be fed at the same time into a mold to give irregularly-labeled, resin-molded articles (rejected products) or the labels would drop and could not be used efficiently.

To solve these problems, used are in-mold labels in which a kneadable low-molecular antistatic agent is kneaded in the heat-sealable ethylenic resin layer, or those in which a low-molecular antistatic agent is applied onto the surface of the heat-sealable ethylenic resin layer and dried to form an antistatic layer thereon.

However, the in-mold labels of both types have a drawback in that the antistatic performance thereof could not last long and its durability is poor. In addition, the former in-mold labels have another problem in that the antistatic agent component therein may migrate or concentrate in the surface of the heat-sealable resin layer, therefore greatly interfere with the fusibility of the heat-sealable resin to containers with the result that the labels could not fuse to containers at all or the labels having fused to containers may blister.

To solve the above problems, proposed is a method of adding a polyether-ester-amide having a long-lasting non-adhesive antistatic capability, to a heat-sealable resin (e.g., JP-A-11-352888).

However, the method has a problem in that, in a process of kneading the additive in a heat-sealable resin and extruding it through a T-die of an extruder to produce labels, it may deposit and degrade around the outlet port of the T-die to give a large amount of burr, or it may deposit on and soil the roll surface in the production line that is in contact with the heat-sealable resin layer with the result that the burr and the dirty deposit may drop off to cause defects of the produced films, and, as a result, the production line must be frequently stopped to clean the die tip and the roll surface.

DISCLOSURE OF THE INVENTION

An object of the invention is to provide an in-mold label for giving labeled resin-molded articles, which has good workability in printing, cutting and blanking even in a low-humidity environment and which has good adhesiveness to containers, and to provide a labeled resin-molded article.

We, the present inventors have assiduously studied in-mold labels having an antistatic capability in a low-humidity environment and, as a result, have found that, when the wetting index of an olefinic resin substrate layer and a heat-sealable resin layer having an antistatic layer on its surface, which are mentioned below, and the initial frictional charge voltage of the olefinic resin substrate layer relative to a sheet offset printing blanket each are defined to fall within a specific range, then the above-mentioned problems can be solved.

Specifically, the invention provides an in-mold label and a labeled resin-molded article having the following constitution:

(1) An in-mold label comprising an olefinic resin substrate layer (A) and a heat-sealable resin layer (B) having an antistatic layer on its surface, wherein the wetting index ($\alpha$) of the surface of the substrate layer (A) is from 34 to 74 mN/m, the wetting index ($\beta$) of the surface of the heat-sealable resin layer (B) is from 30 to 54 mN/m, and the absolute value of the initial frictional charge voltage at 23° C. and a relative humidity of 30% of the substrate layer (A) relative to a sheet offset printing blanket is from 0 kV to 15 kV.

(2) The in-mold label of (1), wherein the half-value period of the frictional charge voltage attenuation of the substrate layer (A) is at most 10 seconds.

(3) The in-mold label of (1) or (2), wherein the substrate layer (A) has a multi-layered structure and is stretched at least in the monoaxial direction thereof.

(4) The in-mold label of any one of (1) to (3), wherein the substrate layer (A) contains a propylenic resin as the main ingredient thereof.

(5) The in-mold label of any one of (1) to (4), wherein the substrate layer (A) contains at least one of an inorganic fine powder and an organic filler and contains voids.

(6) The in-mold label of any one of (1) to (5), wherein the substrate layer (A) has a structure that comprises a core layer of a biaxially-stretched film of a resin composition containing from 5 to 30% by weight of an inorganic fine powder, from 3 to 20% by weight of an ethylenic resin and from 50 to 92% by weight of a propylenic resin, and disposed on both surfaces thereof, a surface layer and a back layer of a monoaxially-stretched film of a resin composition containing from 35 to 65% by weight of an inorganic fine powder, from 0 to 10% by weight of an ethylenic resin and from 35 to 55% by weight of a propylenic resin.

(7) The in-mold label of any one of (1) to (6), wherein the heat-sealable resin layer (B) contains a high-pressure-process polyethylene having a density of from 0.900 to 0.935 g/cm$^3$, a degree of crystallinity (by X-ray diffraction method) of from 10 to 60% and a number-average molecular weight of from 10,000 to 40,000, or a straight linear polyethylene having a density of from 0.880 to 0.940 g/cm$^3$.

(8) The in-mold label of any one of (1) to (7), wherein the thickness of the substrate layer (A) is from 20 to 500 μm, and the thickness of the heat-sealable resin layer (B) is from 1 to 100 μm.

(9) The in-mold label of any one of (1) to (8), wherein the surface of the substrate layer (A) has a pigment-containing coating layer.

(10) The in-mold label of any one of (1) to (9), wherein the surface of the substrate layer (A) is subjected to surface activation treatment.

(11) The in-mold label of any one of (1) to (10), wherein an antistatic layer is provided on the surface of the coating layer or the substrate layer (A).

(12) The in-mold label of (11), wherein the antistatic layer provided on the surface of the coating layer or the substrate layer (A) contains an antistatic agent in an amount of from 0.001 to 10 g per a unit area (m$^2$), and the antistatic layer on the surface of the heat-sealable resin layer (B) contains an antistatic agent in an amount of from 0.001 to 1 g per a unit area (m$^2$).

(13) The in-mold label of (12), wherein the antistatic agent contains a polymer antistatic agent.

(14) The in-mold label of any one of (1) to (13), wherein the antistatic layer is provided according to one or more selected from die, bar, roll, gravure, spray, blade, air knife and size press coating systems.

(15) A labeled resin-molded article with an in-mold label of any one of (1) to (14) stuck to a thermoplastic resin container.

(16) The labeled resin-molded article of (15), wherein the adhesion strength between the in-mold label and the thermoplastic resin container is at least 200 gf/15 mm.

The in-mold label of the invention may well be processed for printing, cutting and blanking even in a low-humidity environment. In the labeled resin-molded article of the invention, the adhesion strength of the label to the container is high.

Figure 1:
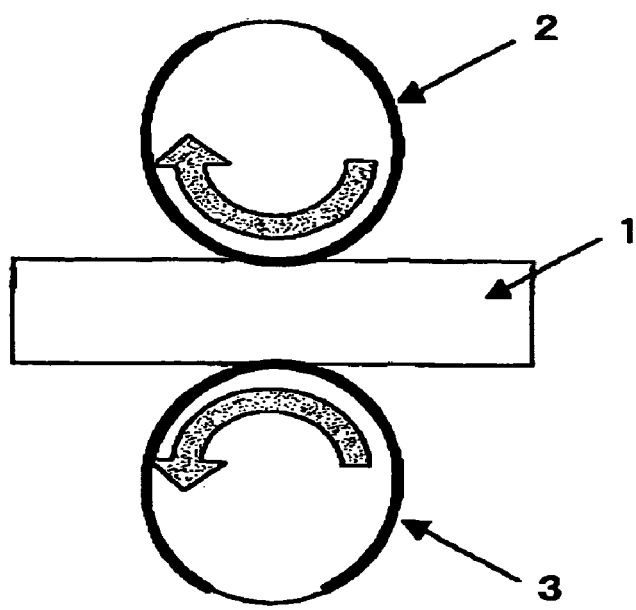
FIG. 1 is a view showing a mechanism of sheet offset printing.

In these drawings, 1 is a sheet; 2 is a blanket for sheet offset printing; 3 is an impression drum; 4 is a friction element; 5 is an olefinic resin substrate layer; 6 is a heat-sealable resin layer; 7 is an in-mold label; 8 is a friction bed; 9 is a sample table, 10 is a sample holder.

BEST MODE FOR CARRYING OUT THE INVENTION

The in-mold label and the labeled resin-molded article of the invention are described in detail hereinunder. In this description, the numerical range expressed by the wording "a number to another number" means the range that falls between the former number indicating the lowermost limit of the range and the latter number indicating the uppermost limit thereof.

The in-mold label of the invention comprises an olefinic resin substrate layer (A) and a heat-sealable resin layer (B) having an antistatic layer on its surface. The wetting index (α) of the surface of the substrate layer (A) is from 34 to 74 mN/m, the wetting index (β) of the surface of the heat-sealable resin layer (B) is from 30 to 54 mN/m. The absolute value of the initial frictional charge voltage of the surface of the substrate (A), as measured using a sheet offset printing blanket and according to the frictional charge voltage attenuation measuring method described in JIS L 1094, falls within a range of from 0 kV to 15 kV.

The substrate layer (A) must have ink acceptability in various printing systems of sheet offset printing, rotary offset printing, gravure printing, flexographic printing, letter-press printing, screen printing and the like, and therefore the wetting index of the surface of the substrate layer (A) is from 34 to 74 mN/m, preferably from 42 to 72 mN/m. If the surface wetting index of the substrate layer (A) is less than 34 mN/m, then the ink acceptability of the layer is insufficient and the printing ink may drop off during blow molding; but if larger than 74 mN/m, then the labels may stick together at their edges during blanking, and they will be difficult to insert into a mold one by one during blow molding.

The heat-sealable resin layer (B) must satisfy sufficient adhesiveness between the label and a resin-molded article. For this, the surface wetting index of the heat-sealable resin layer (B) is from 30 to 54 mN/m, preferably from 34 to 52 mN/m. When the index is 30 mN/m or more, then the affinity between the label and a resin-molded article may be high and the adhesion strength therebetween is practically useful; but if more than 54 mN/m, then the surface polarity may be too high with the result that the adhesiveness between the label and a resin-molded article may be insufficient and the label may readily peel off. The wetting index as referred to in this description is a value measured according to "JIS K 6768 (1999): Wet Tensile Strength Test Method for Plastic Films and Sheets".

The antistatic agent to constitute the antistatic layer of the heat-sealable resin layer (B) may be any of a low-molecular antistatic agent, polymer antistatic agent, an electron-conductive antistatic agent, a conductive filler. The low-molecular antistatic agent includes glycerin fatty acid esters, alkylsulfonate salts, tetraalkylammonium salts, alkylbetaines. the polymer antistatic agent includes quaternary nitrogen-containing acrylic polymers, polyethylene oxides, polyethylene sulfonate salts, carbobetaine graft copolymers. The electron-conductive antistatic agent includes polypyrrole, polyaniline. The conductive filler includes tin oxide, zinc oxide. Above all, those containing a polymer antistatic agent are preferred. The antistatic capability of the heat-sealable resin layer (B) is necessary for preventing troubles of irregular delivery of printed sheets in the paper delivery part in a sheet offset printing process and sticking of labels in a blanking process.

The antistatic capability of the in-mold label may be evaluated by measuring the initial frictional charge voltage and the half-value period of frictional charge voltage attenuation thereof. During sheet offset printing, a sheet (1) is sandwiched between a rubber blanket (2) for sheet offset printing and a metal impression drum (3) that synchronizes with it, and printed thereon, as in FIG. 1. For reproducing the static charge having generated in the sheet in that condition, the initial frictional charge voltage and the half-value period of frictional charge voltage attenuation of the sheet are measured according to the method mentioned below, in the invention.

Figure 2:
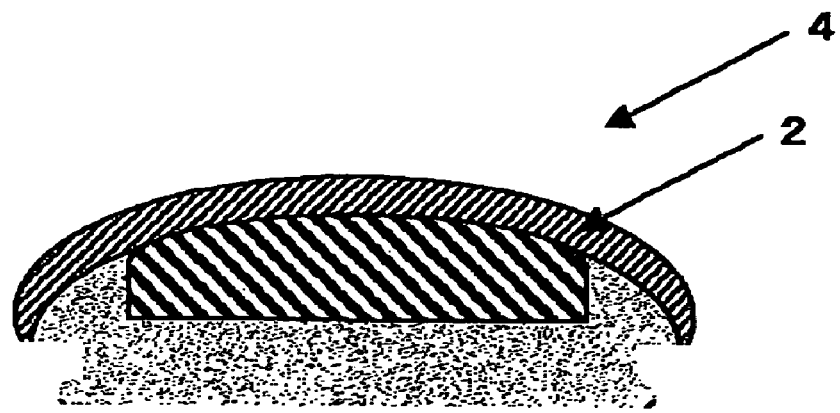
FIG. 2 is a view showing a friction element in a frictional charge voltage meter.
Figure 3:
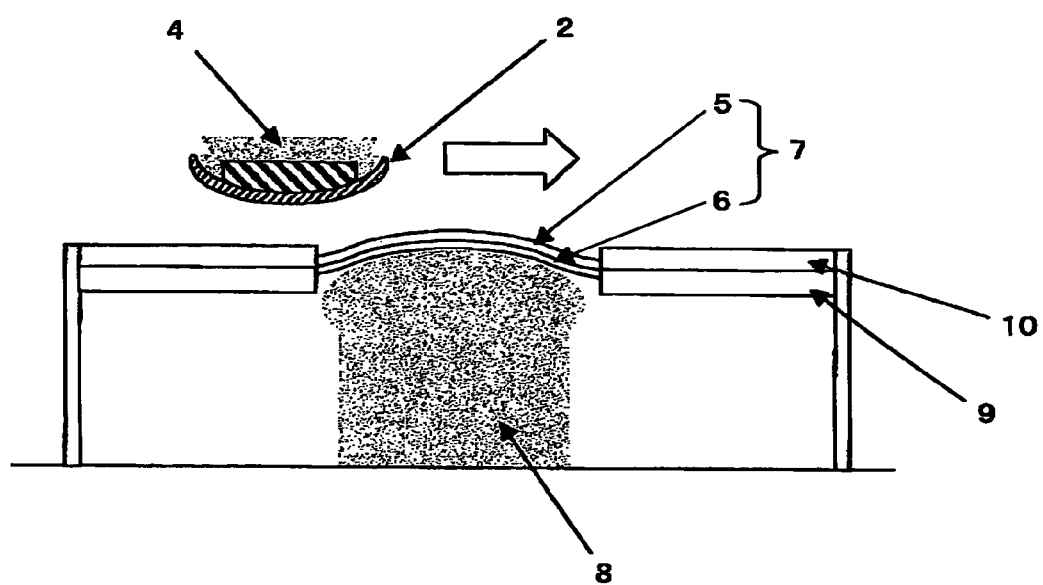
FIG. 3 is a view showing the measurement mechanism of a frictional charge voltage meter.

The measurement of the initial frictional charge voltage in the invention is based on the frictional charge voltage attenuation measuring method described in 5.4 of "JIS L 1094 (1997): Method for Testing Chargeability of Fabrics and Knits", in which a test sample of the in-mold label is measured. The measurement is as follows: First, a rubber blanket (2) for sheet offset printing (trade name; R10 by SRI Hybrid) is fixed to a friction element (4) to cover the friction surface thereof, as in FIG. 2. Next, as in FIG. 3, an in-mold label (7) is fitted to the sample holder (10) provided on a sample table (9) in such a manner that the olefinic resin substrate layer (5) thereof may be in contact with the friction element (4) and the heat-sealable resin layer (6) is in contact with the metallic friction bed (8), and this is fixed on the friction bed (8), and the initial charge of the in-mold label (7) and the sheet offset printing blanket (2) is discharged with a discharger. The in-mold label (7) is rubbed five times in a rate of two times per second all in one direction, and immediately after thus rubbed five times, the in-mold label (7) is rapidly moved to the lower part of a charge receiver in which the charge voltage and its attenuation curve of the sample are recorded. From the curve, the initial frictional charge voltage and the half-value period of frictional charge voltage attenuation of the sample are determined. The charge receiver is so set that the distance between the charge receiver and the in-mold label (7) moved to it could be 50 mm. The measurement is carried out in an environment at 23° C. and a relative humidity of 30%.

Either positive or negative, a larger value of the frictional charge voltage indicates that the tested sample is more readily charged statically. If the value is too large, then it causes troubles in printing and processing the label. A longer half-value period of frictional charge voltage attenuation means that the tested sample is more difficult to discharge. If the half-value period is too long, then it also causes troubles in printing and processing the label.

When the absolute value of the initial frictional charge voltage measured according to the above method is more than 15 kV, then it causes some problems in that the labels may be irregularly delivered in the delivery part in sheet offset printing, and that the static charge between the stacked labels could not be removed in feeding them into a mold by the use of an automatic label feeder, therefore resulting in that two or more labels may be simultaneously fed into a mold to give rejected products of resin-molded articles. Accordingly, the absolute value of the initial frictional charge voltage must be within a range of from 0 kV to 15 kV, preferably from 0 kV to 13 kV, more preferably from 0 kV to 10 kV.

When the half-value period of frictional charge voltage attenuation is too long, then it is inefficient since a lot of time is taken for regularly stacking up the sheets in the paper delivery part in sheet offset printing and the printing speed could not be increased. Accordingly, the half-value period of frictional charge voltage attenuation is preferably at most 10 seconds, more preferably at most 8 seconds, even more preferably at most 6 seconds.

Specifically, the invention has been completed on the basis of the finding that the static charge generation caused by the friction between an in-mold label and an offset printing blanket and therefore problematic for in-mold labels can be effectively prevented by providing an antistatic layer on the surface of the heat-sealable resin layer (B), or that is, the back of the label, not on the side of the substrate layer (A), or that is, the surface of the label, and the initial frictional charge voltage and the attenuation time for the frictional charge voltage of the label can be thereby reduced, and the finding that the printability and the adhesion strength of the label can be improved by specifically defining the wetting index of both the surface and the back of the label.

The substrate layer (A) constituting the in-mold label of the invention contains an olefinic resin as the essential ingredient thereof. The olefinic resin to be used in the substrate layer (A) includes propylenic resin, high-density polyethylene, middle-density polyethylene, polymethyl-1-pentene, ethylene-cyclic olefin copolymer. Two or more these resins may be mixed for use herein. The olefinic resin substrate layer (A) may have a multi-layered structure. It may have a two-layered structure comprising a core layer (c) and a surface layer (D); or a three-layered structure comprising a core layer (C) and a surface layer (D) and a back layer (E) provided on the surface and the back of the core layer; or may have a more multi-layered structure additionally having any other resin film layer between the back/surface layer and the core layer (C).

Preferably, the film to constitute the substrate layer (A) is stretched at least in the monoaxial direction thereof. In case where the substrate layer (A) is formed of plural layers, then at least one of the layers is preferably stretched. In case where plural layers are stretched, they may be individually stretched before laminated; or after laminated, the resulting laminate may be stretched. Stretched layers may be again stretched after laminated. After the heat-sealable resin layer (B) is formed on the substrate layer (A), the whole may be stretched.

Various known methods may be used for the stretching. Preferred is roll stretching to be attained by utilizing the peripheral speed difference between plural rolls. According to the method, the stretching draw ratio may be controlled in any desired manner. In addition, since the resin may be stretched and oriented in the machine direction of film, labels having a higher tensile strength and undergoing smaller dimensional change by tension during printing may be obtained as compared with those of unstretched film. The stretching temperature may be not lower than the glass transition point of the olefinic resin used, when the film is formed of an amorphous resin; and when the film is formed of a crystalline resin, then the stretching temperature may be from the glass transition point of the amorphous part to the melting point of the crystalline part of the film.

The heat-sealable resin layer (B) is so constituted that the adhesion strength between the label of the invention and an in-mold shaped article of a thermoplastic resin container is preferably at least 200 gf/15 mm, more preferably at least 350 gf/15 mm, even more preferably from 450 to 1000 gf/15 mm. If the adhesion strength is too low, then the label may peel off owing to the impact given thereto during transportation of contents-filled, labeled thermoplastic resin containers or during display of products.

Preferably, the substrate layer (A) in the invention has a melting point higher by at least 15° C. than the melting point of the polyolefinic resin that constitutes the heat-sealable resin layer (B); and preferably, it is formed of a propylenic resin in view of its chemical resistance and cost. The propylenic resin may be a propylene homopolymer having isotactic or syndiotactic stereospecificity, or a propylene-based copolymer with an α-olefin such as ethylene, butene-1, hexene-1, heptene-1, 4-methylpentene-1. The copolymer may be a binary, ternary or quaternary copolymer, or may be a random or block copolymer.

Preferably, the substrate layer (A) contains at least one of an inorganic fine powder and an organic filler in addition to the olefinic resin, and contains voids. The inorganic fine powder may have a mean particle size of generally from 0.01 to 15 μm, preferably from 0.01 to 8 μm, more preferably from 0.03 to 4 μm. Concretely, it includes calcium carbonate, calcined clay, silica, diatomaceous earth, talc, titanium oxide, barium sulfate, alumina.

The organic filler may have a mean particle size, after dispersed, of generally from 0.01 to 15 μm, preferably from 0.01 to 8 μm, more preferably from 0.03 to 4 μm. Preferably, a resin different from the essential ingredient, olefinic resin is selected for the organic filler. For example, usable are polyethylene terephthalate, polybutylene terephthalate, polycarbonate, nylon-6, nylon-6,6, homopolymer of cyclic olefin and copolymer of cyclic olefin with ethylene, having a melting point of from 120° C. to 300° C. or a glass transition temperature of from 120° C. to 280° C. Further if desired, the substrate layer (A) may contain a stabilizer, a light stabilizer, a dispersant, a lubricant, a fluorescent brightener, a colorant.

Of the above, the substrate layer (A) is preferably formed of a stretched, porous resin film that comprises a core layer (C) of a biaxially-stretched film of a resin composition containing from 5 to 30% by weight of an inorganic fine powder, from 3 to 20% by weight of an ethylenic resin and from 50 to 92% by weight of a propylenic resin; a surface layer (D) of a monoaxially-stretched film of a resin composition containing from 35 to 65% by weight of an inorganic fine powder, from 0 to 10% by weight of an ethylenic resin and from 35 to 55% by weight of a propylenic resin, stuck to one surface of the core layer (C); and a back layer (E) of a monoaxially-stretched film of a resin composition containing from 35 to 65% by weight of an inorganic fine powder, from 0 to 10% by weight of an ethylenic resin and from 35 to 55% by weight of a propylenic resin, stuck to the other surface of the core layer (C) on the opposite side thereof to the surface layer (D), in view of the dimensional stability of the label in printing, the feedability thereof to mold and the thermal shrinkage resistance thereof.

The stretched resin film is printed on the side of the surface layer (D) thereof; and the heat-sealable resin layer (B) is disposed on the side of the back layer (E) thereof. Preferably, the density of the stretched, porous resin film is within a range of from 0.65 to 1.02 g/cm$^3$.

Not specifically defined in point of the type thereof, the resin to constitute the heat-sealable resin layer (B) may be any one having the function of sticking to the resin material that constitutes a container to which the label is to be stuck under heat in in-mold production of the container. Preferred examples of the resin are polyethylenic resins having a melting point of from 80 to 130° C., for example, low-density to middle-density, high-pressure-process polyethylene having a density of from 0.900 to 0.935 g/cm$^3$, straight linear polyethylene having a density of from 0.880 to 0.940 g/cm$^3$, and ethylene-vinyl acetate copolymer, ethylene-acrylic acid copolymer, ethylene-alkyl acrylate copolymer, ethylene-alkyl methacrylate copolymer (the alkyl group has from 1 to 8 carbon atoms), metal salt (e.g., Zn, Al, Li, K, Na) of ethylene-methacrylic acid copolymer.

Of those, preferred are high-pressure-process polyethylene or straight linear polyethylene having the above-mentioned density and having a degree of crystallinity (by X-ray diffraction method) of from 10 to 60% and a number-average molecular weight of from 10,000 to 40,000. Above all, most preferred is straight linear polyethylene obtained through copolymerization of from 40 to 98% by weight of ethylene and from 2 to 60% by weight of an α-olefin having from 3 to 30 carbon atoms in the presence of a metallocene catalyst (especially, a metallocene-alumoxane catalyst, or a catalyst comprising metallocene compound and a compound capable of reacting with a metallocene compound to form a stable anion, as in WO92/01723), in view of its adhesiveness to resin-molded articles. One or more such polyolefinic resins may be used herein either singly or as mixed.

If desired, the heat-sealable resin layer (B) may be embossed. When embossed, the surface of the heat-sealable resin layer (B) is roughened, and it may prevent blistering in in-mold production of labeled products.

Any other known additives to resin may be optionally added to the heat-sealable resin layer (B) in the invention, not detracting from the necessary properties of the heat-sealable resin layer. The additives include dye, nucleating agent, plasticizer, release agent, antioxidant, antiblocking agent, flame retardant, UV absorbent.

The heat-sealable resin layer (B) may be formed according to a method of laminating a heat-sealable resin film on the substrate layer (A) to thereby form the intended heat-sealable resin layer thereon; or a method that comprises applying an emulsion of a heat-sealable resin or a resin liquid that has been prepared by dissolving a heat-sealable resin in a solvent such as toluene or ethyl cellosolve, onto the substrate layer (A), and then drying it to form the intended heat-sealable resin layer thereon.

The thickness of the substrate layer (A) may be from 20 to 500 μm, preferably from 40 to 200 μm. If the layer is too thin, then it may cause some problems in that the label could not be fixed in the regular position when inserted into a mold by the use of a label inserter, or the label may be wrinkled. If too thick on the contrary, then the strength of the boundary part between the in-mold produced, resin-molded article and the label may lower, and the dropping resistance of the resin-molded article may be poor. The thickness of each constitutive layer may be as follows: The layer (C) is preferably from 19 to 170 μm (more preferably from 38 to 130 μm); the layer (D) is preferably from 1 to 40 μm (more preferably from 2 to 35 μm); the layer (E) is preferably from 1 to 40 μm (more preferably from 1 to 35 μm).

Preferably, the thickness of the heat-sealable resin layer (B) is from 1 to 100 μm, more preferably from 2 to 20 μm. The heat-sealable resin layer (B) must be melted by the heat of the polyethylene or propylenic resin melt that is usable as a parison in molding, whereby the label and the resin-molded article must fuse together; and in order to obtain a sufficient adhesion strength between them, the thickness of the heat-sealable resin layer (B) is preferably at least 1 μm. On the other hand, if the thickness of the layer is more than 100 μm, then the label may curl and its sheet offset printing would be difficult, and, in addition, it would also be difficult to fix the label in a mold.

For improving the printability thereof, the surface of the substrate layer (A) may have a pigment-containing coating layer formed thereon. The pigment-coating layer may be formed by applying pigment to the layer according to an ordinary coating method for coated paper. The pigment-coating agent to be used for the pigment coating may be any ordinary latex for coated paper, which may comprise from 30 to 80% by weight of pigment such as clay, talc, calcium carbonate, magnesium carbonate, aluminium hydroxide, silica, calcium silicate, plastic pigment, and from 20 to 70% by weight of adhesive.

The adhesive for the above includes latex such as SBR (styrene-butadiene copolymer rubber), MBR (methacrylate-butadiene copolymer rubber); and acrylic emulsion, starch, PVA (polyvinyl alcohol), CMC (carboxymethyl cellulose), methyl cellulose. The composition may contain a dispersant, for example, specific polysodium carboxylate such as acrylic acid-sodium acrylate copolymer; and a crosslinking agent such as polyamide-urea resin. The pigment-coating agent is used as a water-soluble coating agent generally having a solid matter concentration of from 15 to 70% by weight, preferably from 35 to 65% by weight.

The surface of the substrate layer (A) or the coating layer may be activated. The activation treatment may be at least one treatment selected from corona discharge treatment, flame treatment, plasma treatment, glow discharge treatment, ozone treatment, preferably corona treatment or flame treatment. In case of corona treatment, the degree of treatment may be from 600 to 12,000 $J/m^2$ (from 10 to 200 $W \cdot min/m^2$), preferably from 1200 to 9000 $J/m^2$ (from 20 to 150 $W \cdot min/m^2$). If smaller than 600 $J/m^2$ (10 $W \cdot min/m^2$), then the corona discharge treatment may be ineffective with the result that, in the subsequent process of applying an aqueous, antistatic agent-containing solution to the layer, the solution may be repelled away; but even if larger than 12,000 $J/m^2$ (200 $W \cdot min/m^2$), the effect of the treatment could not increase anymore. Accordingly, the degree of treatment of at most 12,000 $J/m^2$ (200 $W \cdot min/m^2$) is enough. In case of flame treatment, the degree of treatment may be from 8,000 to 200,000 $J/m^2$, preferably from 20,000 to 100,000 $J/m^2$. If smaller than 8,000 $J/m^2$, then the flame treatment may be ineffective with the result that, in the subsequent process of applying an aqueous, antistatic agent-containing solution to the layer, the solution may be repelled away; but even if larger than 200,000 $J/m^2$, the effect of the treatment could not increase any more. Accordingly, the degree of treatment of at most 200,000 $J/m^2$ is enough. If desired, the surface of the heat-sealable resin layer (B) may also undergo the above activation treatment.

After the surface of the coating layer or the substrate layer (A) is activated as above, it is desirable that the above antistatic layer is provided thereon. Providing the antistatic layer further improves the paper introduction and delivery in printers.

In the invention, when an antistatic layer is provided on the surface of the coating layer or the substrate layer (A), the antistatic layer may contain an antistatic agent in an amount of from 0.001 to 10 g as the solid matter content thereof per a unit area ($m^2$), preferably from 0.002 to 8 g, more preferably from 0.002 to 5 g, even more preferably from 0.005 to 0.1 g. If the amount of the antistatic agent is less than 0.001 g, then the antistatic effect would be insufficient; but if more than 10 g, then the ink acceptability of the layer would be insufficient and the printing ink may drop off during blow molding. Similarly, the antistatic layer on the heat-sealable resin layer (B) may contain an antistatic agent in an amount of from 0.001 to 1 g as the solid matter content thereof per a unit area ($m^2$), preferably from 0.002 to 0.8 g, more preferably from 0.005 to 0.5 g. If the amount of the antistatic agent is less than 0.001 g, then the antistatic effect would be insufficient similarly to the above; but if more than 1 g, then the adhesion strength between the heat-sealable resin layer (B) and the resin-molded article may lower.

The antistatic layer in the invention may be formed, for example, by applying an aqueous solution that contains a polymer antistatic agent alone having the following constitution (a) or further contains, as mixed with it, an ink-receiving component of (b) or (c), onto the layer and drying it thereon.

Component (a): tertiary or quaternary nitrogen-containing acrylic polymer, 100% by weight.

Component (b): polyimine compound, from 0 to 300% by weight.

Component (c): polyamine-polyamide/epichlorohydrin adduct, from 0 to 300% by weight.

The tertiary or quaternary nitrogen-containing acrylic polymer of the component (a) may be obtained through copolymerization of monomers of from 4 to 94% by weight of the following component (i), from 6 to 80% by weight of the following component (ii) and from 0 to 20% by weight of the following component (iii).

Component (i): At Least One Monomer Selected from Compounds of the Following Chemical Formulae (I) to (VII):

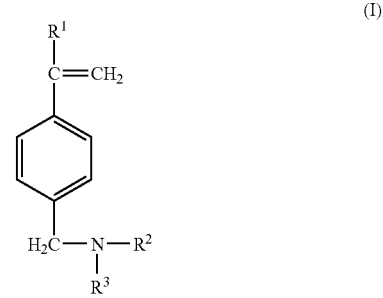

(I)

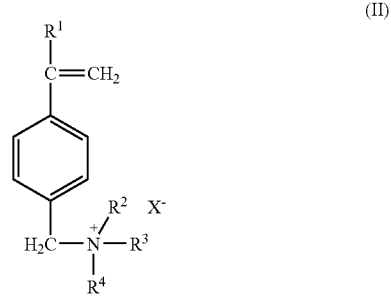

(II)

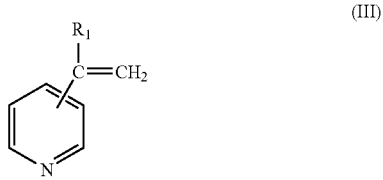

(III)

-continued

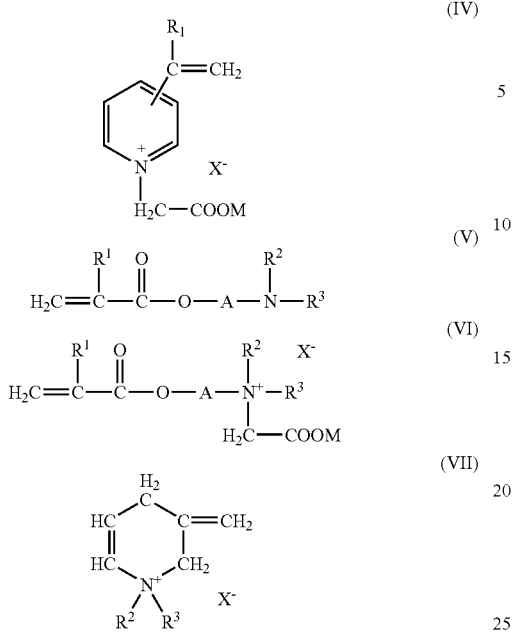

In formulae (I) to (VII), $R^1$ represents a hydrogen atom or a methyl group; $R^2$ and $R^3$ each represent a lower alkyl group (preferably having from 1 to 4 carbon atoms, more preferably 1 or 2 carbon atoms); $R^4$ represents a saturated or unsaturated alkyl or cycloalkyl group having from 1 to 22 carbon atoms; $X^-$ represents a quaternated counter anion to $N^+$ (e.g., halide, especially chloride); M represents an alkali metal ion (e.g., sodium, potassium); A represents an alkylene group having from 2 to 6 carbon atoms.

Of those monomers, preferred are the compounds of formula (VI).

Component (ii): (meth)acrylate:

In the above formula, $R^1$ represents a hydrogen atom or a methyl group; $R^5$ represents an alkyl, alkylene or cycloalkyl group having from 1 to 24 carbon atoms. Concretely, the compound includes butyl acrylate, capryl acrylate, stearyl methacrylate.

Component (iii): Other Hydrophobic Vinyl Monomer.

Examples of the hydrophobic vinyl monomer are styrene and vinyl chloride.

Of the above-mentioned, tertiary nitrogen or quaternary nitrogen-containing acrylic polymer of the component (a), especially preferred is a water-soluble polymer having good antistatic capability of the monomer (i) of formula (VI) where $X^-$ is $Cl^-$; and its commercial products are sold by Mitsubishi Chemical as trade names of Suftomer ST-1000, Suftomer ST-1100, Suftomer ST-1300, Suftomer ST-3200.

Component (b): Polyimine Compound, from 0 to 300% by Weight.

The polyimine compound of the component (b) is a primer for enhancing the adhesion strength of the layer. For example, it includes polyimine compounds selected from a group consisting of polyethyleneimine, polyaminepolyamide-ethyl- eneimine adduct, and their alkyl-modified, alkenyl-modified, benzyl-modified or alicyclic hydrocarbon-modified derivatives with a halide serving as a modifier, such as an alkyl halide, an alkenyl halide, a cycloalkenyl halide or benzyl halide having from 1 to 24 carbon atoms serving, having a degree of polymerization of from 200 to 3,000 and represented by the following formula (IX), and poly(ethylene-imine-urea). These are described in detail in JP-B-2-2910, and JP-A-1-141736.

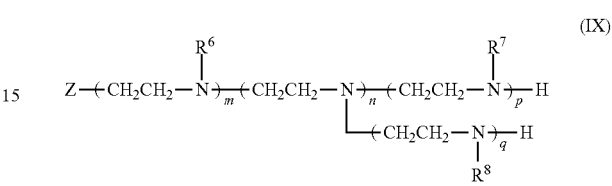

In the formula, Z represents $—NH—R^9$ or a polyaminepolyamide residue; $R^6$ to $R^9$ each independently represent a hydrogen atom, an alkyl group, an alkenyl group, a cycloalkyl group or a benzyl group having from 1 to 24 carbon atoms, at least one of them is a group except hydrogen; m indicates a numerical value of from 0 to 300; and n, p and q each indicate a numerical value of from 1 to 300.

Component (c): Polyamine-Polyamide/Epichlorohydrin Adduct, from 0 to 300% by Weight.

The polyamine-polyamide/epichlorohydrin adduct of the component (c) is also a primer for enhancing the adhesion strength of the layer. It includes a water-soluble cationic thermosetting resin obtained through reaction of a polyamide, which is prepared from a saturated dibasic carboxylic acid having from 3 to 10 carbon atoms and a polyalkylene-polyamine, with epichlorohydrin. The details of such a thermosetting resin are described in JP-B-35-3547. A specific example of the saturated dibasic carboxylic acid having from 3 to 10 carbon atoms is a dicarboxylic acid having from 4 to 8 carbon atoms, especially adipic acid.

An example of the polyalkylene-polyamine is a polyethylene-polyamine, including ethylenediamine, diethylenetriamine, triethylenetetramine, especially diethylene triamine.

In addition to these components, for example, a water-soluble inorganic compound such as sodium carbonate, sodium sulfate, sodium sulfite, sodium thiosulfate, barium hydroxide, sodium metasilicate, sodium pyrophosphate, sodium tripolyphosphate, sodium primary phosphate, potassium alum, ammonium alum, ammonia; a water-soluble organic solvent such as ethyl alcohol, isopropyl alcohol; a surfactant; a water-soluble polymerization agent such as ethylene glycol, polyvinyl alcohol; and other auxiliary materials may be optionally added to the layer.

The blend ratio of the components (a), (b) and (c) may be as follows: Relative to 100% by weight of the nitrogen-containing acrylic resin (a), the polyimine compound (b) is from 0 to 300% by weight, preferably from 0 to 200% by weight, and the polyamine-polyamide/epichlorohydrin adduct (c) is from 0 to 300% by weight, preferably from 0 to 200% by weight. When the antistatic layer has the composition as above, then the surface of the olefinic resin substrate layer and/or the surface of the heat-sealable resin layer are hardly statically charged, and the paper introduction and delivery may be good. These components (a), (b) and (c) may be used as an aqueous solution thereof having an overall solid matter content of generally from 0.1 to 10% by weight, preferably from 0.1 to 5% by weight.

For applying the above-mentioned, aqueous antistatic agent solution (coating agent) onto the surface of the heat-sealable resin layer (B) or the surface of the substrate layer (A) or the coating layer, employable is any coating method of die, bar, roll, gravure, spray, blade, air knife or size press coating, or their combination. Depending on the viscosity of the coating agent, the coating amount and the coating speed, a predetermined amount of the coating agent is measured, using a die, a roll, a gravure or a spray, and transferred onto a roll or a size press and applied to the object; or a larger amount than a predetermined amount of the coating agent is transferred using a die or a roll, and then the excessive coating agent is scraped off with a bar, a blade or an air knife to thereby make the predetermined amount of the coating agent applied onto the object; or a predetermined amount of the coating agent may be directly applied onto the object, using a die or a spray. More concretely, for a coating mode where a coating agent having a viscosity of from 10 to 1000 cP (from 0.01 to 1 Ns/m$^2$) is applied onto the object to a coating amount of from 1 to 20 g/m$^2$ at a coating speed of at most 300 m/sec, an offset gravure system, a spray system or a rotor dampening system may be employed. The offset gravure system is a combination of gravure coating and roll coating, in which the coating agent is transferred from a gravure plate to a roll, and while the liquid is transferred from one roll to another, the gravure plate form is removed and the coating agent is smoothed, and thereafter the agent is transferred onto the surface of each layer. In a spray system where spraying and size-pressing are combined, the coating agent is fed from a supply unit to a spray-coating unit to thereby form a uniform coating film before the size press, and this is then transferred from the size press to the heat-sealable resin layer. Accordingly, this method is favorable in applying a small amount of the coating agent to the layer. Rotor dampening is a type of spray coating, and the method comprises atomizing the coating agent with a rotor that is driven by a belt to rotate rapidly, and directly applying the resulting mist to the surface of each layer.

After coated with the coating agent, the coated layer may be further optionally smoothed or dried to thereby remove any excess water and hydrophilic solvent, and the intended antistatic layer is thus formed thereon.

The in-mold label is set in a differential-pressure molding mold in such a manner that its printed surface faces the inner face of the lower female mold part, then it is fixed to the inner wall of the mold by suction, and thereafter a melt of a container-forming material resin sheet is led to the area above the lower female mold part and is molded according to an ordinary differential-pressure molding process, whereby a labeled resin-molded article is formed in which the label is integrally fused to the outer wall of the container. The differential-pressure molding may be any of vacuum molding or pressure molding. In general, the two are combined, and preferably further combined with plug-assisted technology for differential-pressure molding. The in-mold label is especially favorable for blow molding in which a resin melt parison is fitted by pressure to the inner wall of a mold. To that effect, the labeled resin-molded article is produced as follows: The label is fixed in a mold, and the label is integrated with the resin-molded article, in which, therefore the label is not deformed and the adhesion strength between the resin-molded article body and the label is high. Thus produced, therefore, the label-modified, resin-molded article has no blister and has good outward appearance.

The material of the thermoplastic resin container is not specifically defined. For example, usable are ethylene homopolymers such as high-density polyethylene, middle-density polyethylene, linear low-density polyethylene, ultra-low-density polyethylene produced through polymerization with a single-site catalyst; polyolefinic resins such as ethylene-α-olefin copolymer, branched low-density polyethylene, ethylene-vinyl acetate copolymer, polypropylene; and other polyethylene terephthalate resin, polyethylene naphthalate resin, polyamide resin, polyvinyl chloride resin, polystyrenic resin, polycarbonate resin. In addition, blends of plural resins including the above-mentioned resins are also usable. Further, those that contain an inorganic filler and any other modifier or color pigment are also usable. The layer constitution may be any of a single-layered or multi-layered one. For example, a barrier resin layer of a saponified ethylene-vinyl acetate copolymer or a polyamide resin, and also an adhesive resin layer for the layer to the basic layer may also be laminated.

The characteristics of the invention are described more concretely with reference to the following Examples and Comparative Examples. In the following Examples, the material used, its amount and the ratio, the details of the treatment and the treatment process may be suitably modified or changed not overstepping the sprit and the scope of the invention. Accordingly, the invention should not be limitatively interpreted by the Examples mentioned below.

EXAMPLE 1

Production of Substrate Layer

A resin composition (C) comprising 67% by weight of a polypropylene homopolymer (trade name by Nippon Polypro, Novatec PP MA-8, having a melting point of 164° C.), 10% by weight of a high-density polyethylene (trade name by Nippon Polyethylene, Novatec HD HJ580, having a melting point of 134° C.), and 23% by weight of calcium carbonate powder having a mean particle size of 1.5 μm was melt-kneaded at 250° C. in an extruder, and extruded out through a die into a film. This was cooled to about 50° C. The film was re-heated at about 150° C., and then stretched 4-times in the machine direction by utilizing the peripheral speed difference between rolls. A monoaxially stretched film to be a core was thus obtained.

On the other hand, a resin composition (D) comprising 51.5% by weight of a polypropylene homopolymer (trade name by Nippon Polypro, Novatec PP MA-3), 3.5% by weight of a high-density polyethylene (trade name by Nippon Polyethylene, Novatec HD HJ580), 42% by weight of calcium carbonate powder having a mean particle size of 1.5 μm, and 3% by weight of titanium oxide powder having a mean particle size of 0.8 μm was melt-kneaded at 240° C. in a different extruder, and this was filmwise extruded out through a die and laminated onto the surface of the above-mentioned, monoaxially-stretched film to obtain a laminate of surface layer/core layer (D/C).

Further, also using different extruders, a composition (E) comprising 51.5% by weight of a polypropylene homopolymer (trade name by Nippon Polypro, Novatec PP MA-3), 3.5% by weight of a high-density polyethylene (trade name by Nippon Polyethylene, Novatec HD HJ580), 42% by weight of calcium carbonate powder having a mean particle size of 1.5 μm, and 3% by weight of titanium oxide powder having a mean particle size of 0.8 μm; and, as a heat-sealable resin layer, a mixture (B) comprising 75 parts by weight of an ethylene/1-hexene copolymer (having a 1-hexene content of 22% by weight, a degree of crystallinity of 30, and a number-average molecular weight of 23,000), which had been obtained through copolymerization of ethylene and 1-hexene with a metallocene catalyst and had MFR of 18 g/10 min and a density of 0.898 g/cm$^3$, and 25 parts by weight of a high-pressure-process low-density polyethylene having MFR of 4 g/10 min, a density of 0.92 g/cm$^3$, a degree of crystallinity (by X-ray diffraction method) of 40% and a number-average molecular weight of 18,000 were melted and kneaded at 200° C., and fed into one coextrusion die in which they were laminated, and they were filmwise extruded out through the die, whereby they were further laminated on the above laminate (D/C) in such a manner that the heat-sealable resin layer could be the outermost layer on the side of the core layer, thereby producing a four-layered laminate of surface layer/core layer/back layer/heat-sealable resin layer (D/C/E/B). The resulting laminate was led onto an embossing roll (150 lines/inch; reversed gravure pattern) composed of a metal roll and a rubber roll on the layer B side thereof, whereby the heat-sealable resin layer (B) was embossed with a 0.17 mm-pitch pattern.

The four-layered laminate was led into a tenter oven, heated at 155° C., then stretched 7-fold in the cross direction by the use of the tender, then annealed at 164° C. and thereafter cooled to 55° C., and its edges were trimmed away. Then, this was subjected to corona discharge treatment at 50 W/m$^2$/min on the side of the surface layer (D) thereof. Next, an aqueous solution containing 0.5% by weight of the following (a), 0.4% by weight of (b) and 0.5% by weight of (c) was applied to the surface layer side of the film according to a size-pressing system in such a manner that the coating layer could contain, after dried, 0.01 g per a unit area (m$^2$) of the antistatic agent. Then, an aqueous solution containing the following (a) was sprayed onto the side of the heat-sealable resin layer (B) in such a manner that the coating layer could contain, after dried, 0.01 g per a unit area (m$^2$) of the antistatic agent. After dried, the antistatic layer was thus formed on both the surface layer and the back layer of the film.

(a) Quaternary nitrogen-containing acrylic tercopolymer comprising the following units:

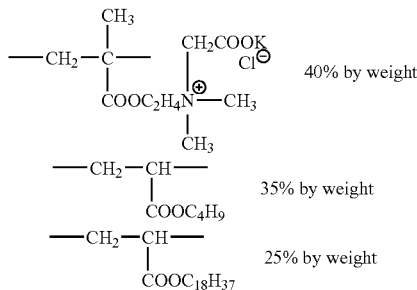

(b) Butyl-modified polyethylenimine (AC-72, trade name by Mitsubishi Chemical).
(c) Water-soluble polyamine-polyamide/epichlorohydrin adduct (WS-4002, trade name by Seiko PMC).

The wetting index of the surface of the olefinic resin substrate layer (A, or that is, D/C/E) and the surface of the heat-sealable resin layer (B) were measured, and were 70 mN/m and 34 mN/m, respectively.

Accordingly, a six-layered, laminated stretched resin film having a thickness of about 100 μm (antistatic layer/D/C/E/B/antistatic layer =ultra-thin/30/40/25/5 ultra-thin μm; as a result of electromicroscopic observation of the cross section of the film) was obtained.

The six-layered, laminated stretched resin film was cut with a sheet cutter into kiku-half size (636 mm×470 mm) sheets for in-mold labels.

<Printing>

Thus obtained, the in-mold label sheets were printed on the surface side thereof in an environment at 23° C. and a relative humidity of 30%, using an offset printer, Komori Corporation 's Lithlon and UV offset ink, T&K TOKA's Bestcure, at a speed of 6000 sheets/hr. The UV offset four-color print on them includes product name, manufacturer name, dealer name, character, bar code and instructions for use. The sheets were well regularly stacked up in the paper delivery part, and their acceptability of every ink was good.

<Blanking>

Next, the thus-printed sheets for in-mold labels were blanked out into in-mold labels having a length of 11 cm and a width of 9 cm. The cut edges of the labels were checked for blocking, and no blocking was found therearound.

<Sticking>

The in-mold label was fixed in one half of a split mold for blow molding, in such a manner that its surface layer side could be in contact with the mold under vacuum suction, and then a high-density polyethylene (Nippon polyethylene's trade name, Novatec HD HB330, having a melting point of 134° C.) was melt-extruded at 220° C. into the mold to form a parison. With that, the split mold was closed, and a pressure of 4.2 kg/cm$^2$ was applied to the parison so that the parison was inflated to be a container while thermally fused with the in-mold label in the mold. After thus molded, the mold was cooled, and then opened to obtain a labeled resin container having a capacity of 1000 ml. Of the resin container, the label print did not fade and the label did neither shrink nor blister.

EXAMPLE 2

An in-mold label and a labeled resin container were produced in the same manner as in Example 1, for which, however, the antistatic layer on the side of the heat-sealable resin layer (B) was formed by applying an aqueous solution containing the quaternary nitrogen-containing acrylic tercopolymer (a) in such a manner that the layer could contain, after dried, 0.1 g per a unit area (m$^2$) of the antistatic agent. The wetting index of the surface of the olefinic resin substrate layer (A) and that of the heat-sealable resin layer (B) were 70 mN/m and 50 mN/m, respectively.

EXAMPLE 3

An in-mold label and a labeled resin container were produced in the same manner as in Example 1, for which, however, the antistatic layer on the side of the heat-sealable resin layer (B) was formed by applying an aqueous solution containing 1.0% by weight of the quaternary nitrogen-containing acrylic tercopolymer (a) and 0.5% by weight of the water-soluble polyamine-polyamide/epichlorohydrin adduct (c) (Seiko PMC's trade name WS-4002) in such a manner that the layer could contain, after dried, 0.01 g per a unit area (m$^2$) of the antistatic agent. The wetting index of the surface of the olefinic resin substrate layer (A) and that of the heat-sealable resin layer (B) were 70 mN/m and 38 mN/m, respectively.

EXAMPLE 4

An in-mold label and a labeled resin container were produced in the same manner as in Example 1, for which, however, the antistatic layer on the side of the olefinic resin layer (A) was formed by applying an aqueous solution containing 0.5% by weight of the quaternary nitrogen-containing acrylic tercopolymer (a), 0.4% by weight of the butylation-modified polyethyleneimine (b) and 0.5% by weight of the water-soluble polyamine-polyamide/epichlorohydrin adduct (c) in such a manner that the layer could contain, after dried, 0.002 g per a unit area (1 m$^2$) of the antistatic agent. The wetting index of the surface of the olefinic resin substrate layer (A) and that of the heat-sealable resin layer (B) were 48 mN/m and 34 mN/m, respectively.

COMPARATIVE EXAMPLE 1

An in-mold label and a labeled resin container were produced in the same manner as in Example 1, for which, however, the antistatic layer was not formed on the side of the heat-sealable resin layer (B). The wetting index of the surface of the olefinic resin substrate layer (A) and that of the heat-sealable resin layer (B) were 70 mN/m and 32 mN/m, respectively.

COMPARATIVE EXAMPLE 2

An in-mold label and a labeled resin container were produced in the same manner as in Example 1, for which, however, the antistatic layer on the side of the heat-sealable resin layer (B) was formed by applying an aqueous solution containing the quaternary nitrogen-containing acrylic tercopolymer (a) in such a manner that the layer could contain, after dried, 3 g per a unit area (m$^2$) of the antistatic agent. The wetting index of the surface of the olefinic resin substrate layer (A) and that of the heat-sealable resin layer (B) were 70 mN/m and 62 mN/m, respectively.

TEST EXAMPLE

The in-mold labels and the labeled resin containers of Examples 1 to 4 and Comparative Examples 1 and 2 were analyzed and evaluated for their physical properties, according to the methods mentioned below.
(1) Determination of Physical Properties:
(a) Wetting Index:
The wetting index ($\alpha$) of the surface of the substrate layer (A) and the wetting index ($\beta$) of the surface of the heat-sealable resin layer (B) of each in-mold label were measured in an environment at 23° C. and a relative humidity of 50%, using Diversified Enterprises' ACCU DYNE TEST.
(b) Initial Frictional Charge Voltage and Half-Value Period of Frictional Charge Voltage Attenuation:
Using a frictional charge voltage meter, Kanebo Engineering's EST-8, the data were measured according to the method mentioned above.
(2) Sheet Offset Printing:
(c) Ink Acceptability:
Using an offset printer, Komori Corporation's Lithlon, 1000 kiku-half size (636 mm×470 mm) sheets were continuously printed in an environment at 23° C. and a relative humidity of 30%, at a speed of 6000 sheets/hr. Next, the sheets were dried with an UV emitter, and the degree of the ink adhesiveness to each sheet was determined as follows: Nichiban's Cellotape™ was stuck to each sheet, and peeled away, and the sheet was checked for its condition and evaluated according to the following criteria:
◯: The ink did not peel, and the substrate layer underwent material fracture in some samples.
Δ: There was some resistance in peeling the tape, but almost all the ink peeled, and this is problematic in practical use.
x: All the ink peeled, and there was no resistance in peeling the tape.
(d) Paper Travelability:
Under the condition mentioned above, the sheets were printed and checked for their travelability in a printer. After irradiated with an UV emitter, the sheets were also checked as to whether their edges could be trued up in the delivery zone of the printer. Thus tested, the sheets were evaluated according to the following criteria:
◯: The sheets are smoothly fed into a printer and travel therein, and their edges are well trued up in the delivery zone.
x: While fed, the sheets are often troubled, or their edges are not trued up in the delivery zone.
(3) Blanking:
(e) Blanking Aptitude:
100 labeled sheets were stacked up, and blanked with a rectangular blanking tool having a length of 11 cm and a width of 9 cm. The cut edges of the sheets were checked for blocking.
◯: No blocking occurred, and the samples have no problem in their practical use.
x: Blocking occurred, and the samples have some problem in their practical use.
(4) In-Mold Molding:
(f) Label/Bottle Adhesion Strength:
A label stuck to a container in blow molding was cut into 15-mm wide strips. Using a tensile tester (Shimadzu Seisakusho's Autograph AGS-D Model), the adhesion strength between the label and the container was measured by peeling the label from the strip in a direction forming a T-like figure at a pulling rate of 300 mm/min. The samples were evaluated for the practicability of the label according to the following criteria:
More than 350 (g/15 mm): Practicable with no problem.
From 200 to 350 (g/15 mm): Somewhat week adhesiveness but practicable with no problem.
Less than 200 (g/15 mm): Impracticable.
(g) Blistering:
Labeled blow-molded containers were compared in point of the frequency of label blistering.
◯: Practicable with no problem.
x: Impracticable.

TABLE 1

| | Coating Amount of Antistatic Agent (g/m$^2$) | | Wetting Index (mN/m) | | Frictional Charge | | Sheet Offset Printing | | Blanking | In-Mold Molding | |
|---|---|---|---|---|---|---|---|---|---|---|---|
| | Olefinic Resin Substrate Layer (A) Side | Heat-Sealable Resin Layer (B) Side | $\alpha$ | $\beta$ | Initial Frictional Charge Voltage (kV) | Half-Value Period of Frictional Charge Voltage Attenuation (sec) | Ink Acceptability | Paper Travelability | Blanking Aptitude | Label/Bottle Adhesion Strength (gf/15 mm) | Blistering |
| Example 1 | 0.01 | 0.01 | 70 | 34 | 9 | 6 | ◯ | ◯ | ◯ | 480 | ◯ |
| Example 2 | 0.01 | 0.1 | 70 | 50 | 4 | 1 | ◯ | ◯ | ◯ | 380 | ◯ |
| Example 3 | 0.01 | 0.01 | 70 | 38 | 8 | 1 | ◯ | ◯ | ◯ | 460 | ◯ |
| Example 4 | 0.002 | 0.01 | 48 | 34 | 13 | 7 | ◯ | ◯ | ◯ | 480 | ◯ |

TABLE 1-continued

| | Coating Amount of Antistatic Agent (g/m²) | | Wetting Index (mN/m) | | Frictional Charge | | Sheet Offset Printing | | Blanking | In-Mold Molding | |
|---|---|---|---|---|---|---|---|---|---|---|---|
| | Olefinic Resin Substrate Layer (A) Side | Heat-Sealable Resin Layer (B) Side | α | β | Initial Frictional Charge Voltage (kV) | Half-Value Period of Frictional Charge Voltage Attenuation (sec) | Ink Acceptability | Paper Travelability | Blanking Aptitude | Label/Bottle Adhesion Strength (gf/15 mm) | Blistering |
| Comparative Example 1 | 0.01 | 0 | 70 | 32 | 17 | 8 | ○ | X | ○ | 500 | ○ |
| Comparative Example 2 | 0.01 | 3 | 70 | 62 | 8 | 1 | ○ | ○ | X | 160 | X |

INDUSTRIAL APPLICABILITY

The in-mold label of the invention may be well printed, cut and blanked even in a low-humidity environment. Accordingly, the in-mold label of the invention has the advantages of easy production and practical use. In the labeled resin-molded article of the invention, the adhesion strength between the label and the container is high. Accordingly, there is no trouble of label peeling in use of the article. Therefore, the invention has a possibility of its wide utilization in the modern society.

The invention claimed is:

1. An in-mold label comprising
an olefinic resin substrate layer (A) and
a heat-sealable resin layer (B) having an antistatic layer on its surface, wherein the wetting index (α) of the surface of the substrate layer (A) is from 34 to 74 mN/m,
the wetting index (β) of the surface of the heat-sealable resin layer (B) is from 30 to 54 mN/m, and
the absolute value of the initial frictional charge voltage at 23° C. and a relative humidity of 30% of the substrate layer (A) relative to a sheet offset printing blanket is from 0 kV to 15 kV.

2. The in-mold label according to claim 1, wherein the half-value period of the frictional charge voltage attenuation of the substrate layer (A) is at most 10 seconds.

3. The in-mold label according to claim 1, wherein the substrate layer (A) has a multi-layered structure and is stretched at least in the monoaxial direction thereof.

4. The in-mold label according to claim 1, wherein the substrate layer (A) contains a propylenic resin as the main ingredient thereof.

5. The in-mold label according to claim 1, wherein the substrate layer (A) contains at least one of an inorganic fine powder and an organic filler, and contains voids.

6. The in-mold label according to claim 1, wherein the substrate layer (A) has a structure that comprises a core layer of a biaxially-stretched film of a resin composition containing from 5 to 30% by weight of an inorganic fine powder, from 3 to 20% by weight of an ethylenic resin and from 50 to 92% by weight of a propylenic resin, and disposed on respective surfaces thereof, a surface layer and a back layer of a monoaxially-stretched film of a resin composition containing from 35 to 65% by weight of an inorganic fine powder, from 0 to 10% by weight of an ethylenic resin and from 35 to 55% by weight of a propylenic resin.

7. The in-mold label according to claim 1, wherein the heat-sealable resin layer (B) contains a high-pressure-process polyethylene having a density of from 0.900 to 0.935 g/cm³, a degree of crystallinity (by X-ray method) of from 10 to 60% and a number-average molecular weight of from 10,000 to 40,000, or a straight linear polyethylene having a density of from 0.880 to 0.940 g/cm³.

8. The in-mold label according to claim 1, wherein the thickness of the substrate layer (A) is from 20 to 500 μm, and the thickness of the heat-sealable resin layer (B) is from 1 to 100 μm.

9. The in-mold label according to claim 1, wherein the surface of the substrate layer (A) has been subjected to surface activation treatment.

10. The in-mold label according to claim 1, wherein the antistatic layer is provided according to one or more selected from die, bar, roll, gravure, spray, blade, air knife and size press coating systems.

11. The in-mold label according to claim 1, wherein an antistatic layer is provided on the surface of the substrate layer (A).

12. The in-mold label according to claim 1, wherein the surface of the substrate layer (A) has a pigment-containing coating layer.

13. The in-mold label according to claim 12, wherein an antistatic layer is provided on the surface of the substrate layer (A) or the coating layer.

14. The in-mold label according to claim 13, wherein the antistatic layer provided on the surface of the coating layer or the substrate layer (A) contains an antistatic agent in an amount of from 0.001 to 10 g per a unit area (m²), and the antistatic layer on the surface of the heat-sealable resin layer (B) contains an antistatic agent in an amount of from 0.001 to 1 g per a unit area (m²).

15. The in-mold label according to claim 14, wherein the antistatic agent contains a polymer antistatic agent.

16. A labeled resin-molded article with an in-mold label of claim 1 stuck to a thermoplastic resin container.

17. The labeled resin-molded article according to claim 16, wherein the adhesion strength between the in-mold label and the thermoplastic resin container is at least 200 gf/15 mm.

* * * * *